(12) United States Patent
Watters et al.

(10) Patent No.: US 8,438,644 B2
(45) Date of Patent: May 7, 2013

(54) INFORMATION SYSTEM SECURITY BASED ON THREAT VECTORS

(75) Inventors: John P. Watters, Dallas, TX (US); Matthew Keane, Dallas, TX (US)

(73) Assignee: iSIGHT Partners, Inc., Dallas, TX (US)

(*) Notice: Subject to any disclaimer, the term of this patent is extended or adjusted under 35 U.S.C. 154(b) by 93 days.

(21) Appl. No.: 13/042,066

(22) Filed: Mar. 7, 2011

(65) Prior Publication Data
US 2012/0233698 A1   Sep. 13, 2012

(51) Int. Cl.
| | |
|---|---|
| G06F 11/00 | (2006.01) |
| G06F 12/14 | (2006.01) |
| G06F 12/16 | (2006.01) |
| G06F 11/30 | (2006.01) |
| G06F 21/00 | (2006.01) |
| G06F 9/445 | (2006.01) |
| G08B 23/00 | (2006.01) |

(52) U.S. Cl.
USPC ............... 726/25; 726/23; 713/188; 713/189; 705/51; 717/176

(58) Field of Classification Search ............ 726/25
See application file for complete search history.

(56) References Cited

U.S. PATENT DOCUMENTS

| | | | |
|---|---|---|---|
| 6,947,978 B2 | 9/2005 | Huffman et al. | |
| 7,234,168 B2 * | 6/2007 | Gupta et al. | 726/25 |
| 7,293,287 B2 * | 11/2007 | Fischman et al. | 726/22 |
| 7,308,715 B2 * | 12/2007 | Gupta et al. | 726/23 |
| 7,409,714 B2 * | 8/2008 | Gupta et al. | 726/23 |
| 7,624,444 B2 * | 11/2009 | Gupta et al. | 726/23 |
| 7,958,027 B2 * | 6/2011 | Lawrence | 705/35 |
| 8,010,469 B2 * | 8/2011 | Kapoor et al. | 706/20 |
| 8,091,065 B2 * | 1/2012 | Mir et al. | 717/104 |
| 8,132,260 B1 * | 3/2012 | Mayer et al. | 726/25 |
| 8,135,657 B2 * | 3/2012 | Kapoor et al. | 706/45 |
| 8,250,651 B2 * | 8/2012 | Huang et al. | 726/22 |
| 8,272,053 B2 * | 9/2012 | Markham et al. | 726/23 |
| 2003/0009699 A1 * | 1/2003 | Gupta et al. | 713/201 |
| 2003/0051026 A1 * | 3/2003 | Carter et al. | 709/224 |

(Continued)

FOREIGN PATENT DOCUMENTS

WO   2009083036 A1   7/2009

OTHER PUBLICATIONS

Foreign Communication From a Related Counterpart Application—International Search Report and Written Opinion, PCT/US2009/042006, Jun. 19, 2009, 11 pages.

(Continued)

*Primary Examiner* — Carolyn B Kosowski

(57) ABSTRACT

A security system is provided. The system comprises a computer system, a memory accessible to the computer system, a data store, and an application. The data store comprises a threat catalog, wherein the threat catalog comprises a plurality of threat vectors, each threat vector comprising a plurality of fields, wherein each field is constrained to carry a value selected from a predefined list of enumerated values. The application is stored in the memory and, when executed by the computer system receives a threat report, wherein the threat report comprises an identification of at least one threat vector, determines a correlation between the at least one threat vector received in the threat report with the threat vectors comprising the threat catalog, and, based on the correlation, sends a notification to a stakeholder in an organization under the protection of the security system.

19 Claims, 6 Drawing Sheets

U.S. PATENT DOCUMENTS

| | | | |
|---|---|---|---|
| 2003/0056116 A1* | 3/2003 | Bunker et al. | 713/201 |
| 2003/0097588 A1* | 5/2003 | Fischman et al. | 713/200 |
| 2003/0177376 A1* | 9/2003 | Arce Velleggia et al. | 713/189 |
| 2003/0233319 A1 | 12/2003 | Lawrence | |
| 2005/0210275 A1 | 9/2005 | Homing et al. | |
| 2006/0015941 A1 | 1/2006 | McKenna | |
| 2006/0031940 A1 | 2/2006 | Rozman et al. | |
| 2006/0059557 A1* | 3/2006 | Markham et al. | 726/22 |
| 2006/0080637 A1 | 4/2006 | Treit et al. | |
| 2006/0117386 A1* | 6/2006 | Gupta et al. | 726/23 |
| 2006/0191007 A1* | 8/2006 | Thielamay | 726/22 |
| 2007/0006315 A1* | 1/2007 | Bushnaq | 726/25 |
| 2007/0100642 A1 | 5/2007 | Paulus et al. | |
| 2007/0113281 A1 | 5/2007 | Leach | |
| 2007/0180522 A1* | 8/2007 | Bagnall | 726/22 |
| 2007/0180525 A1* | 8/2007 | Bagnall | 726/23 |
| 2007/0186284 A1* | 8/2007 | McConnell | 726/25 |
| 2007/0192859 A1 | 8/2007 | Shahar et al. | |
| 2007/0192867 A1* | 8/2007 | Miliefsky | 726/25 |
| 2007/0240217 A1 | 10/2007 | Tuvell et al. | |
| 2007/0251988 A1 | 11/2007 | Ahsan et al. | |
| 2008/0028470 A1* | 1/2008 | Remington et al. | 726/25 |
| 2008/0082380 A1* | 4/2008 | Stephenson | 705/7 |
| 2009/0099885 A1 | 4/2009 | Sung et al. | |
| 2009/0178139 A1* | 7/2009 | Stute et al. | 726/22 |
| 2009/0300589 A1 | 12/2009 | Watters et al. | |
| 2010/0235918 A1* | 9/2010 | Mizrahi et al. | 726/25 |
| 2011/0173699 A1* | 7/2011 | Figlin et al. | 726/23 |
| 2011/0178942 A1 | 7/2011 | Watters et al. | |
| 2011/0252479 A1 | 10/2011 | Beresnevichiene et al. | |
| 2012/0072983 A1* | 3/2012 | McCusker et al. | 726/22 |

OTHER PUBLICATIONS

Stewart, Joe, "Truman—The Reusable Unknown Malware Analysis Net," SecureWorks, Version 2, Jun. 1991, 1 page.

Wikipedia, "Bayesian Inference," http://en.wikipedia.org/w/index.php?title=Bayesian_inference&printable=yes, May 15, 2008, 12 pages.

Wikipedia, "Botnet," http://en.wikipedia.org/w/index.php?title=Botnet&printable=yes, May 11, 2008, 6 pages.

Office Action dated May 3, 2012, U.S. Appl. No. 12/132,327, filed Jun. 3, 2008.

Foreign Communication From a Related Counterpart Application—European Search Report, European Application No. 12158396.7, Apr. 6, 2012, 6 pages.

Office Action dated Jul. 3, 2012, U.S. Appl. No. 12/689,160, filed Jan. 18, 2012.

Final Office Action dated Aug. 8, 2012, U.S. Appl. No. 12/132,327, filed Jun. 3, 2008.

Notice of Allowance dated Dec. 24, 2012, U.S. Appl. No. 12/689,160, filed Jan. 18, 2010.

* cited by examiner

INFORMATION SYSTEM SECURITY BASED ON THREAT VECTORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Corporations and other organizations are vulnerable to a variety of threats. If a threat is actualized in the form of an attack, the organization may lose considerable value. Attacks can result in a direct loss of money, loss of confidential information which later can be monetized, loss of infrastructure availability, loss of data integrity, loss of customer confidence, loss of brand value, and other losses. Attacks may take a variety of forms including, but not limited to, employee theft, embezzlement, robbery, sabotage, infection with computer viruses, compromised credit card accounts, database invasions, and others. As tactics for thwarting and parrying attacks are developed and implemented by organizations, new attacks are devised and attempted by bad actors. Cyber crime and/or computer-based crime is becoming increasingly important as more value is aggregated in electronic artifacts such as financial accounts and databases.

SUMMARY

In an embodiment, a security system is disclosed. The system comprises a computer system, a memory accessible to the computer system, a data store, and an application. The data store comprises a threat catalog, wherein the threat catalog comprises a plurality of threat vectors, each threat vector comprising a plurality of fields, wherein each field is constrained to carry a value selected from a predefined list of enumerated values. The application is stored in the memory and, when executed by the computer system receives a threat report, wherein the threat report comprises an identification of at least one threat vector, determines a correlation between the at least one threat vector received in the threat report with the threat vectors comprising the threat catalog, and, based on the correlation, sends a notification to a stakeholder in an organization under the protection of the security system.

In an embodiment, a method of managing security risks is disclosed. The method comprises defining a plurality of threat descriptors, wherein defining a threat descriptor comprises defining an enumerated list of values that the threat descriptor can take on and analyzing an organization to identify a plurality of threat paths, wherein each threat path associates an asset or a procedure of the organization with a threat source and with one of an attack tool, an attack tactic, or an attack procedure. The method further comprises, based on the threat paths, building a threat catalog comprising a plurality of threat vectors, wherein each threat vector comprises a plurality of threat descriptor values, receiving a threat report comprising a plurality of threat vectors, and correlating each of the threat vectors in the threat report with the threat vectors in the threat catalog. The method further comprises, based on correlating the threat vectors in the threat report with the threat vectors in the threat catalog, revising a security risk metric of the organization and presenting the revised security risk metric.

In an embodiment, a method of managing security risks is disclosed. The method comprises defining a plurality of threat descriptors, wherein defining a threat descriptor comprises defining an enumerated list of values that the threat descriptor can take on and analyzing a first organization to identify a plurality of threat paths, wherein each threat path associates an asset or a procedure of the organization with a threat source and with one of an attack tool, an attack tactic, or an attack procedure. The method further comprises, based on the threat paths, building a threat catalog comprising a plurality of threat vectors, wherein each threat vector comprises a plurality of threat descriptors. The method further comprises receiving a first threat report comprising a first manifest threat vector, wherein the first manifest threat vector identifies aspects of an attack experienced by a second organization and correlating the first manifest threat vector with the threat vectors in the threat catalog. The method further comprises, based on correlating, revising a security risk metric of the organization and presenting the revised security risk metric.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
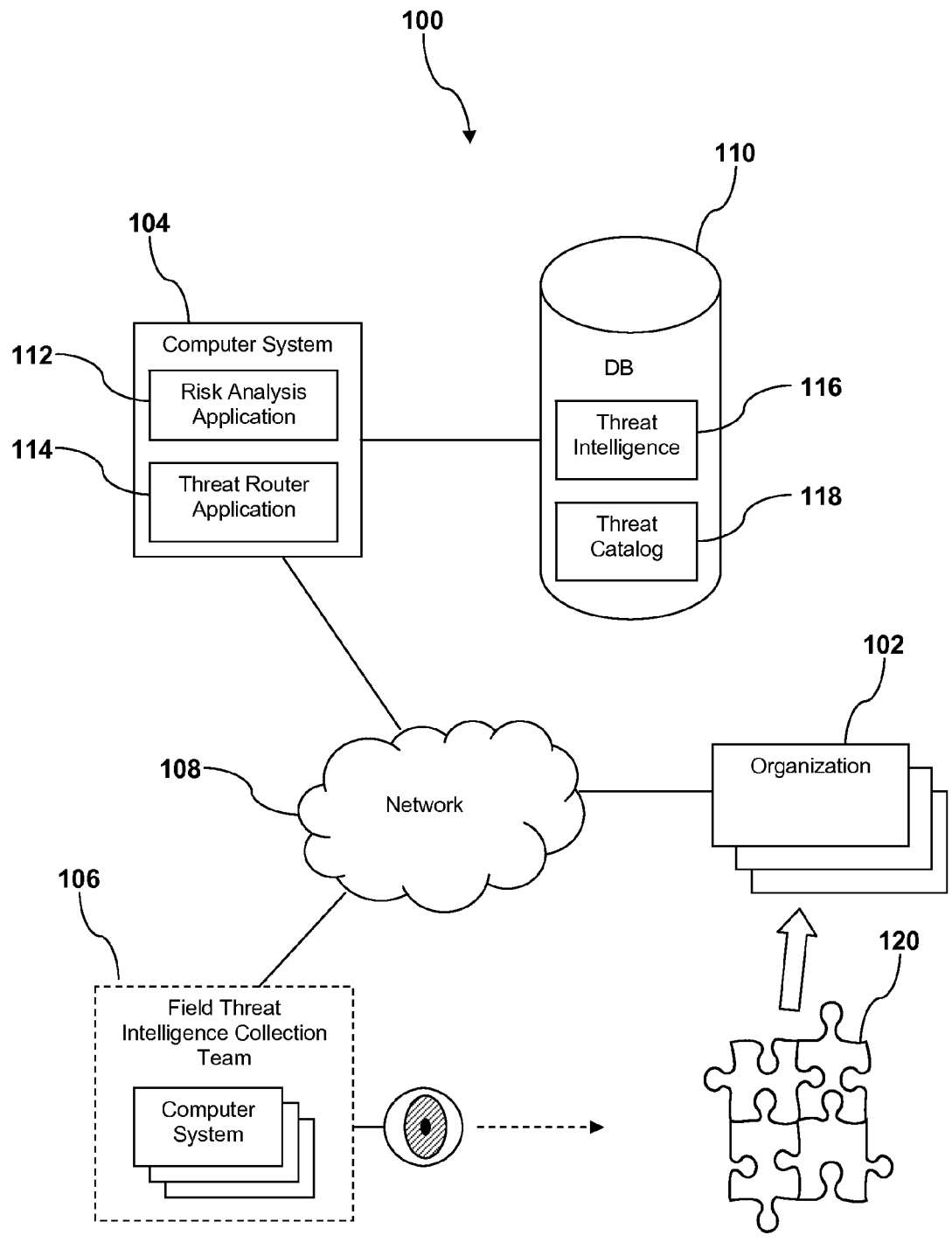
FIG. 1 is a block diagram of a security system network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The collection of intelligence on security threats often includes a large volume of information that is not relevant to a specific organization. For example, in some cases cyber crime analysts may provide a monthly threat report that comprises about 50 pages or more of narrative text describing the latest threat intelligence. Of these 50 pages of narrative text, quite little of the text may be relevant to a given organization. Sifting through the report to identify the relevant information may consume excess time, and important security information may be overlooked because it was lost in the welter of information. It is a challenge for an organization to assimilate the often unordered, unranked threat intelligence; to identify what portion of the intelligence, if any, bears on their security concerns; and to convey the pertinent threat intelligence to the individual or team responsible for responding to the threat. The situation may be analogized to an organization receiving a haystack possibly containing a needle that is of interest to the organization—where the haystack corresponds with the unordered, unranked threat intelligence and the possible needle is threat information that relates to a vulnerability of the organization that can be addressed and/or mitigated.

It is a teaching of the present disclosure that threat intelligence shall be marshaled and/or coerced into a convention of expression that promotes automated correlation of threat intelligence with threat vulnerabilities of the organization. In an embodiment, threat intelligence is captured in threat vectors that comprise a plurality of threat descriptors, each threat descriptor associated with a single aspect or parameter of a threat. In some contexts a threat descriptor may be referred to as a field of a threat vector. The values that any threat descriptor can take on are predefined and expressly enumerated. For example, an item of threat intelligence may be articulated, at least in part, by a geography descriptor value, a technology descriptor value, and an asset descriptor value. The geography descriptor value may identify a region where a threat has been manifested, for example China. The technology descriptor value may identify a technology employed to actuate the threat, for example a malware that accesses credit card accounts. The asset descriptor value may identify an asset of the organization that is vulnerable to the threat, for example a secure database of credit card accounts. Threat intelligence articulated as threat vectors may be provided by field agents, by peer organizations sharing threat experiences, by intrusion detection systems sharing information, by electronic intrusion response systems sharing information about detected electronic intrusions, and by other detection and/or countermeasures tools.

An automated correlation program analyzes the threat vectors delivered in a threat intelligence report or in another form in the context of a threat catalog identifying the threats that the organization cares about or deems to have a potential impact on the organization. The threats stored in the threat catalog comprise threat vectors articulated using the same convention of expression that is used to articulate the threat intelligence. When the correlation of a threat vector with a threat stored in the threat catalog rises to a threshold magnitude, a notification can be generated and transmitted to an individual or team in the organization that is responsible for securing the organization against the subject threat. The threat catalog may assign a weight to each threat vector to indicate a range of vulnerability amplitude. The threats stored in the threat catalog can identify the appropriate individual, individuals, team, and/or teams responsible for securing the organization against each cataloged threat.

A perfect match between a threat vector and a threat stored in the threat catalog may not be the only condition that leads to notification and/or that raises a flag. For example, the threshold may be defined such that a 66% match and/or correlation may trigger notification. The correlation program that identifies matches and/or near matches between threat vectors reported by intelligence gathering and threat vectors stored in the threat catalog and transmits notifications may be referred to in some contexts as a threat router and/or a threat correlator. The value of the match, possibly in combination with a weight associated with a threat stored in the threat catalog, may be used to decide to send a notification to a high level manager, to a low level manager, or to not send any notification at all.

The automated correlation program may communicate with or be integrated with a security risk management tool. The security risk management tool may present visualizations of the exposure to threats, the projected impact of threats, and/or the projected financial losses from security attacks of an organization based on an analysis of the threat vulnerability and/or susceptibility of the organization to attacks and based on an analysis of the offsetting security countermeasures that the organization has deployed to mitigate security risks posed by the threats. In an embodiment, the security risk management tool may present a curve that represents a relationship between investment in security counter measures and projected financial losses due to attacks on the security of the organization. In an embodiment, the security risk management tool may present a curve that represents a relationship between investment in security counter measures and projected adverse impact due to attacks on the security of the organization, where the projected adverse impact may take account of not only projected financial losses but also takes into account projected damage to qualities which may not be readily quantifiable in financial terms, for example customer confidence, business reputation, and other values. On initialization of the security risk management tool a threat catalog may be defined based on the analysis. Further, the weight, the importance and/or the value of the threat vectors stored in the threat catalog, the value and/or weight of offsetting countermeasures, and the projected financial losses of the organization due to attacks on security at one or more operating points may be defined during initialization.

The relationship between investment in security measures and projected financial losses and/or adverse impact may be generated based on the initial operating points, based on the threat catalog, based on the countermeasures, and based on a presumed mathematical form of the relationship. The relationship between security investments and projected financial losses and/or adverse impact may be used to allocate security budgets and to choose among security investment alternatives. As threat vectors are received in intelligence reports, from intrusion detection systems, and from a collaborative threat sensing system and analyzed by the correlation program the relationship between security investments and projected financial losses and/or adverse impact is adjusted by the security risk management tool, for example the curve is reshaped and/or shifted and return on investment values for deploying specific countermeasures are re-determined. The coupling of threat intelligence delivered in the form of threat vectors conforming to the predefined threat descriptor definitions with the dynamic adaptation of the visualization provided by the security risk management tool promotes the timely, efficient management of security risks by the organization. It is understood that the projected impact represents an adverse impact associated with one or more threat vectors, either manifest threat vectors and/or vulnerability threat vectors, that may relate to business disruption, direct financial loss, brand damage, and other. The projected adverse impact may be considered in terms of relative severity and quantifiable impact, when practical.

The threat intelligence is collected in part by field agents that seek to discover germane threat information. In an embodiment, the threat intelligence gathering activity identifies information targets based on a threat prioritization defined by a community of organizations, for example a plurality of business enterprises that have deployed the security risk management tool. This prioritization increases the probability that threat information germane to the security interests of the subject organizations is collected. The field agents may be employed by a trusted intermediary. The security risk management tool may be developed by and sold or leased by the trusted intermediary.

Furthermore, threat intelligence may be collected in part from reports of security attacks experienced by organizations, which may be referred to as a collaborative threat sensing system. These reports may be generated by police, investigators, insurers, the organizations that have experienced the subject security attacks, or others. Such reports of security attacks may identify aspects of the security attacks in the same conventional language and/or articulation methodology employed by field agents. Alternatively, the trusted intermediary may receive the reports of security attacks and transform them into corresponding threat vectors to provide in threat intelligence to the automated correlation program. The reports of security attacks may comprise information about countermeasures that were effective against the subject security attack and/or information about countermeasures that were ineffective against the subject security attack. It is contemplated that as more and more reports of security attacks are collected from organizations that the threat intelligence collection activity becomes at least partially self-sustaining.

Threat intelligence may be provided in the form of threat vectors by various automated and/or electronic tools for detecting intrusion attempts and/or for coping with actual intrusions. For example, firewalls may execute software that analyzes network traffic that is addressed to points inside the firewall to reject traffic that fails security tests. For example, traffic that does not provide appropriate security tokens may be rejected. Further, traffic that does provide appropriate security tokens may be rejected on the basis of a source address associated with the traffic, such as an internet protocol (IP) address that is known to pose a security threat or an internet protocol address of an IP address anonymizer. Likewise, automated tools for identifying the signs of electronic intrusions and coping with the intrusions after the fact may provide threat intelligence in the form of threat vectors. The sharing of threat information from these several sources in a coherent and consistent articulation may create a virtuous circle redounding to the benefit of all the organizations sharing the subject threat intelligence, possibly mediated by the trusted intermediary.

Turning now to FIG. 1, a security network 100 is described. In an embodiment, the security network 100 comprises a plurality of organizations 102, a first computer system 104, a field threat intelligence collection team 106, and a network 108. The network 108 may comprise any of a private network, a public network, a voice network, a data network, or combinations thereof. Portions of the network 108 may provide virtual private network (VPN) functionality. Portions of the network 108 may provide wireless links to couple devices into a wired network. The network 108 provides communication links between the first computer system 104, the field threat intelligence collection team 106, and the organizations 102. The security network 100 promotes the security of the organizations 102, for example reducing the exposure of the organizations 102 to electronic crime attacks such as credit card account theft, identify theft, data theft, and other threats to information security. In some contexts, electronic crime may be referred to as cyber crime. The organizations 102 may be business enterprises, corporations, governments, governmental organizations, religious organizations, non-profit organizations, political organizations, and/or other organizations. It is understood that the security network 100 may take a variety of forms that differ in one or more ways from the depiction in FIG. 1 and that the present disclosure further contemplates these alternative forms.

The first computer system 104 may be a computer suitable for the volume of processing that it is called upon to complete. Computers are discussed in further detail hereinafter. The first computer system 104 may comprise a server computer and/or a plurality of server computers. The first computer system 104 is coupled to a first data store 110. While the first computer system 104 is illustrated as directly coupled to the first data store 110, in an embodiment the first computer system 104 may be coupled to the first data store 110 via the network 108. A first risk analysis application 112 and a first threat router application 114 may be executed by the first computer system 104. It is understood that in alternative embodiments the first risk analysis application 112 and the first threat router application 114 may be integrated into a single application or one or both of the first risk analysis application 112 or the first threat router application 114 may be partitioned into a plurality of applications and/or components.

In an embodiment, the first risk analysis application 112 may be used to define threat vectors and to store threat vectors in a threat intelligence 116 portion of the first data store 110. For example, the first risk analysis application 112 may provide a user interface on a workstation coupled to the first computer 104, and a user may define threat vectors by inputting threat descriptor values. The user may be an employee of the trusted intermediary. The user may define the threat vectors based on threat intelligence reports provided in textual, non-conforming form by the field threat intelligence collection team 106. The user may be assisted in articulating the threat intelligence in conforming, marshaled form by the user interface provided by the first risk analysis application 112. The user may further assign a weight or confidence value to the threat vector to provide a measure or indication of the relative quality of the intelligence on which the threat vector is based.

For example, the user interface may present mandatory threat vector descriptors or threat vector fields and optional threat vector descriptors. The user interface may present a list of valid descriptor values for each threat descriptor. The user interface may provide a control for saving the threat vector to the threat intelligence 116 and may require inputs for all mandatory threat vector descriptors before performing the selected save operation. Alternatively, the field threat intelligence collection team 106 may employ a similar tool or interface to compose their threat intelligence reports and may define threat vectors at the same time as generating textual narratives associated with the threat vectors. The threat vectors may comprise a link to a textual narrative associated with the subject threat intelligence. In some contexts, a threat vector in the threat intelligence 116 may be referred to as a manifest threat vector, to convey the understanding that the manifest threat vector is connected to a threat that has been detected or observed in the actual world, "in the wild." Such threats observed in the wild may have launched electronic crime attacks and been either successful or rebuffed by countermeasures systems. Alternatively, manifest threat vectors also may be connected to a threat that has been identified theoretically without observance. For example, a theoretical threat may have been discussed on a clandestine cyber crime on-line forum or discussed in an electronic crime conference.

The first risk analysis application 112 may also be used to define and store threat vectors in a first threat catalog 118 portion of the first data store 110. The first threat catalog 118 may define threat vectors that articulate security threats that have been identified to be of concern to one or more of the organizations 102. In an embodiment, the first threat catalog 118 may be segmented into a plurality of dedicated areas, a dedicated area for each organization 102. The first threat catalog 118 may be further segmented into one or more sector areas, a sector area associated with threats of common concern to a plurality of organizations 102 operating in the same sector. The first threat catalog 118 may further comprise a general area that stores threats that are expected to be of common concern to all organizations 102.

The segments of the first threat catalog 118 may be implemented as different data store tables. Alternatively, the segment to which each threat vector is associated may be defined in a threat descriptor of the threat vector. In some contexts, a threat vector in the first threat catalog 118 may be referred to as a vulnerability threat vector to convey the understanding that the vulnerability threat vector is connected to a threat susceptibility or a vulnerability to a specific threat. In some contexts, an association of a single identified asset to a single technology to a single potential actor in reference to a threat vulnerability may be referred to as a threat path.

The vulnerability threat vectors in the first threat catalog 118 may also be created using a different tool. The vulnerability threat vectors in the first threat catalog 118 may be defined during an initial deep analysis of an organization 102, for example when the trusted intermediary is first deploying a security risk management tool to the subject organization 102. This initial deep analysis may comprise identifying valued assets, determining attack vulnerabilities of these valued assets, assigning weights and/or importance values to the security of the subject assets, identifying technologies that might be employed in exploiting these attack vulnerabilities, and identifying potential actors who might perpetrate such an attack. This process may be referred to in some contexts as threat mapping. For further details on threat mapping see U.S. patent application Ser. No. 12/132,327, filed Jun. 3, 2008, entitled "Electronic Crime Detection and Tracking," by John P. Watters et al., which is incorporated by reference herein.

In some contexts, a threat map may comprise the totality of identified paths between identified assets through technologies to potential actors. Alternatively, a single path between a single identified asset, a single technology, and a single potential actor may be referred to as a threat map, and a plurality of threat maps may be identified by the first threat catalog 118. Alternatively, a plurality of threat maps may be associated with an organization where each threat map may comprise a plurality of paths between a single identified asset, a single technology, and a single potential actor.

In this later case, a first threat map may be associated with a general threat specificity (a low level of threat specificity, for example involving computer viruses), a second threat map may be associated with a sector threat specificity (a moderate level of threat specificity, for example involving malware to compromise financial accounts of any financial services company), and a third threat map may be associated with a targeted threat specificity (a high level of threat specificity, for example involving exploit code directed to breaking the proprietary security application used by a large electrical power utility company). In an embodiment, there may be a different number of threat maps. In an embodiment, there may be a first threat map associated with threats of general specificity and a second threat map associated with all remaining threats. In an embodiment, there may be a first threat map associated with threats of general specificity and of sector specificity and a second threat map associated with threats of targeted threat specificity. In some contexts, a path between a single identified asset, a single technology, and a single potential actor may be referred to as a threat path. It is understood that the present disclosure contemplates alternative schemes for partitioning a plurality of threat paths to each of a plurality of threat maps. Additionally, it is contemplated that an aggregated threat map may be composed of a plurality of threat maps. Continuing the example above, a fourth threat map may be composed as the aggregation of the first threat map, the second threat map, and the third threat map.

The first threat router application 114 may analyze the threat intelligence 116 and the first threat catalog 118 to determine correlations between a manifest threat vector and a vulnerability threat vector. The first threat router application 114 may determine correlations based in part on the weight and/or importance value associated with a threat vector: the defined threshold value may be adapted based on the weight and/or importance value associated with the threat vector. Alternatively, the first threat router application 114 may determine correlations based in part on a weighting and/or importance assigned to the different parameters of the threat vector parameters. When a sufficient correlation is identified, for example when the determined correlation exceeds a defined threshold value, the first threat router application 114 may send notification of the subject manifest threat vector to an appropriate stakeholder in one or more of the organizations 102. The first threat router application 114 may send a notification to a lower level stakeholder in the organization 102 when the correlation is above a first predetermined value but not above a second predetermined value but may send notification to a higher level stakeholder in the organization 102 when the correlation is above the second predetermined value. The first threat router application 114 may be referred to in some contexts as "a needle router," with reference to the analogy of locating a needle of highly germane threat information in a haystack of voluminous threat intelligence and routing this highly germane threat information to someone in the vulnerable organization 102 that can actually take timely action to respond to the subject threat.

The first threat router application 114 may be configured to identify several different levels of correlation, for example uncorrelated, moderate correlation, and high correlation. Alternatively, the first threat router application 114 may be configured to identify correlation level 1, correlation level 2, correlation level 3, correlation level 4, and correlation level 5. In combination with the present disclosure, one skilled in the art will readily determine a triage scheme and correlation criteria for associating manifest threat vectors to the correlation levels that is effective for discriminating among the varying amounts of interest that the threat intelligence and/or the manifest threat vectors have to the organization 102. The correlation levels may be defined by rules and/or lookup tables that are defined by each organization 102 and stored in the first data store 110 or configured into the first threat router application 114. If the rules and/or lookup tables are stored in the first data store 110, the first threat router application 114 may be designed to refer to the first data store 110 to access the rules and/or lookup tables.

The field threat intelligence collection team 106 may comprise a plurality of investigators and/or analysts who investigate, study, research, probe for, and otherwise obtain a variety of information about threats 120. Threat information may be a fully fleshed out coherent narrative of a threat in the wild. For example, the threat information may identify a specific actor or actors, a region or city in which the actor operates, a technology that is typically used by the actor, an asset that the actor is motivated to attack, and other related information. In many instances, however, the threat information does not comprise a complete end-to-end narrative and may be likened to a puzzle. By collecting portions of threat information and periodically and/or continuously reanalyzing the aggregation of threat information, some puzzle pieces can be linked to form threat intelligence information that can be articulated in the form of manifest threat vectors. As discussed further above, the field threat intelligence collection team 106 further may compose manifest threat vectors based on theoretical threats.

The field threat intelligence collection team 106 or, alternatively, another team associated with the trusted intermediary may also receive reports of attacks experienced by one of the organizations 102. For example, an organization 102 may report that a number of their credit card accounts were compromised and electronic criminals made bogus charges to the accounts, effectively stealing funds from the organization 102. The reports may provide a variety of information about the attack including countermeasures that were applied successfully and/or unsuccessfully to defeat and/or remediate the attack. The field threat intelligence collection team 106 may analyze these attack reports, create threat vectors capturing at least some of the information contained in the attack reports, and provide these manifest threat vectors to the threat intelligence 116 in the first data store 110 via the intermediary of the first computer system 104 or, alternatively, by writing the manifest threat vectors directly to the threat intelligence 116 in the first data store 110. In some cases the attack reports may be sent directly to the first computer system 104 or other computer systems within the domain of the trusted intermediary for analysis and generation of manifest threat vectors to be propagated to the threat intelligence 116 in the first data store 110. In some cases individuals in the organization 102, for example information system security personnel, may generate manifest threat vectors and send them to the computer system 104 for inclusion in the threat intelligence 116.

Manifest threat vectors may also be automatically generated by automated countermeasures and transmitted to the trusted intermediary. For example, intrusion detection systems (IDSs) integrated in a firewall of an organization 102 may detect attempts to subvert the firewall security, generate a report, create an associated manifest threat vector, and send the manifest threat vector to the computer system 104 for inclusion in the threat intelligence 116. For example, a financial account monitor may detect that a plurality of financial accounts have been scanned by malware in preparation for monetizing the subject financial accounts—indicating the accounts have already been compromised—generate a report, create an associated manifest threat vector, and send the manifest threat vector to the computer system 104 for inclusion in the threat intelligence 116. In an embodiment, updating the threat intelligence 116 may trigger the threat router application 114 to determine a correlation between the new manifest threat vector and the vulnerability threat vectors already stored in the threat catalog 118 and possibly to send notification to appropriate stakeholders in the organizations 102 identifying the manifest threat and conveying that a peer organization 102 may have already experienced an attack and/or financial losses.

Figure 2:
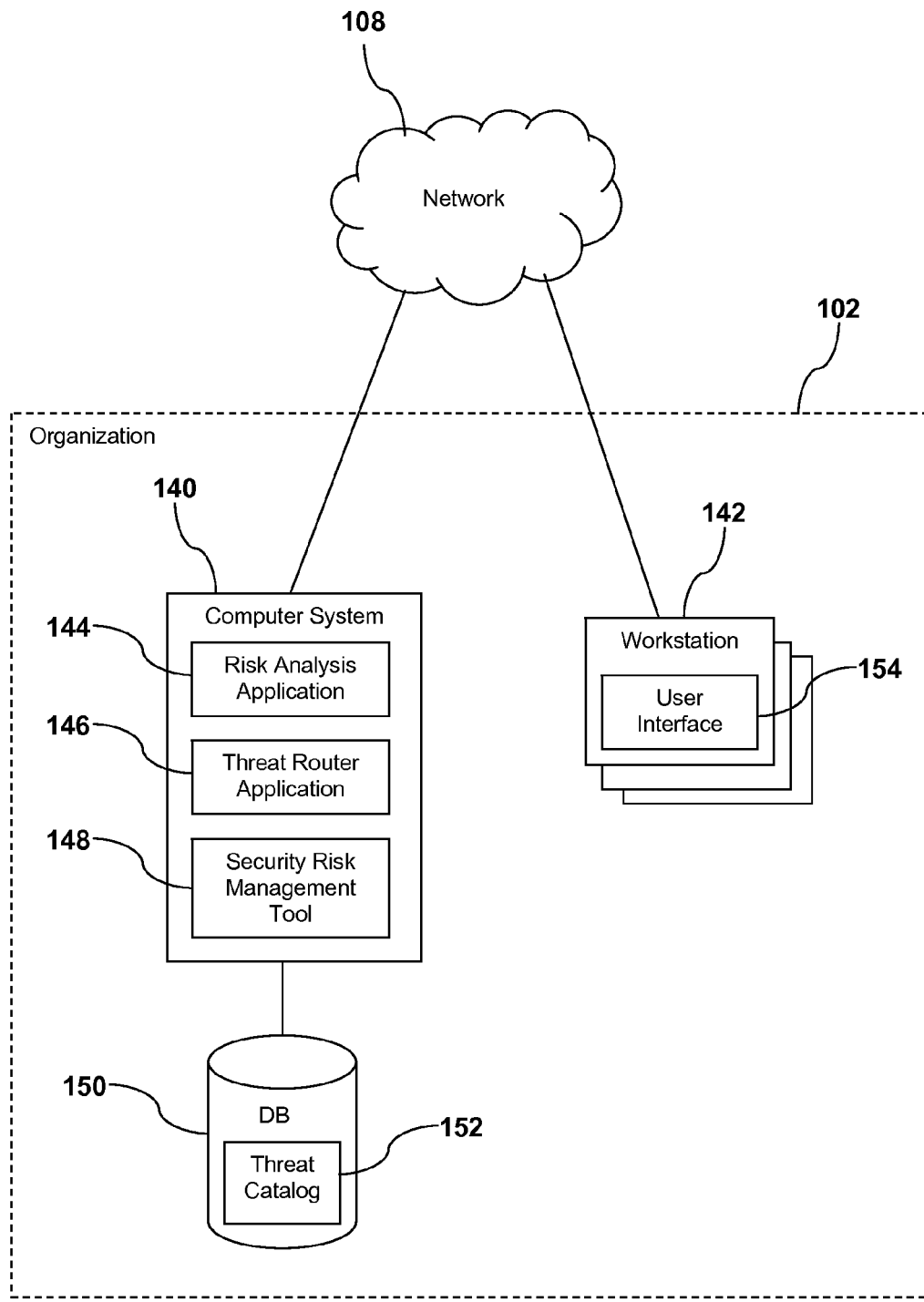
FIG. 2 is a block diagram of a security system according to an embodiment of the disclosure.

Turning now to FIG. 2, an exemplary organization 102 is described. In an embodiment, the organization 102 comprises a second computer system 140 and a plurality of workstations 142, each having a user interface 154. The second computer system 140 may execute a second risk analysis application 144, a second threat router application 146, and a security risk management tool 148. The second computer system 140 may be coupled to a second data store 150 comprising a second threat catalog 152. It is understood that while the second computer system 140 is shown coupled to the workstations 142 via the network 108, the information passing between the second computer system 140 and the workstations 142 may pass over a portion of the network 108 that is protected by a firewall security system that interfaces the organization 102 to the public network portion of the network 108.

As already stated further above, it is contemplated that the security network 100 may be implemented in forms that are somewhat different from that depicted in and discussed with reference to FIG. 1. For example, the correlation between manifest threat vectors and vulnerability threat vectors may be conducted by the second threat router application 146 based on vulnerability threat vectors stored in the second threat catalog 152. In such an embodiment, the vulnerability threat vectors of the organization 102 are not stored in the first data store 110 but instead are stored within the organization 102 which may be a more secure location. Because the vulnerability threat vectors associated with the organization 102, according to one point of view, may be considered to provide a sign post signaling the most acute attack vulnerabilities of the organization 102, it is desirable to assure the security of these vulnerability threat vectors. At one level of analysis, storing the vulnerability threat vectors of the several organizations 102 separately may be thought to be more secure than storing them at one single central location. Additionally, it may be desirable for purposes of limiting financial liability of the trusted intermediary should an attack succeed in reading these vulnerability threat vectors that these vulnerability threat vectors be stored within the organization 102 and not in the domain of the trusted intermediary.

The second risk analysis application 144 and the second threat router application 146 may provide functionality substantially similar to that provided by the first risk analysis application 112 and the first threat router application 114, respectively, described above with reference to FIG. 1. The second risk analysis application 144 may be employed to define the vulnerability threat vectors of the organization 102 and to store them in the second threat catalog 152 in the second data store 150. Alternatively, the second risk analysis application 144 may write the vulnerability threat vectors back to the first threat catalog 118 in the first data store 110.

The second threat router application 146 may determine correlations of manifest threat vectors, for example threat vectors contained in a threat report generated by the trusted intermediary based on the threat intelligence 116 and transmitted to the organization 102 via the network 108, with vulnerability threat vectors stored in the threat catalog 152. The second threat router application 146 may further determine correlations of manifest threat vectors with vulnerability threat vectors stored in the threat catalog 118, for example vulnerability threat vectors associated with a specific industry sector and/or vulnerability threat vectors of general interest. At one level of abstraction, the threat catalogs 118, 152 may be considered to comprise an aggregated threat catalog, and determination of correlation of a manifest threat vector with vulnerability threat vectors may be performed with reference to such an aggregated threat catalog. When the second threat router application 146 determines that a manifest threat vector correlates sufficiently with a vulnerability threat vector, the second threat router application 146 may send a notification to a stakeholder or first responder. Also, the second threat router application 146 may send correlation information to the security risk management tool 148.

The security risk management tool 148 provides a variety of security related functions. At least a portion of this functionality is provided by a tool for visualizing the risks and/or security vulnerabilities of the organization 102, for assigning values to the risks and/or threats, for assigning values to countermeasures and/or risk mitigations, and for visualizing a relationship between security investment and projected security losses. For further information about a tool for visualizing the relationship between security investment and projected security losses, see U.S. patent application Ser. No. 12/689,160, filed Jan. 18, 2010, entitled "Targeted Security Implementation Through Security Loss Forecasting," by John P. Watters, et al., which is incorporated by reference herein.

The security risk management tool 148 may determine a security risk metric of the organization 102 based at least in part on the correlations between manifest threat vectors and vulnerability threat vectors. This security risk metric may be a number indicating a relative security risk of the organization 102. In an embodiment, the security risk metric may be a value in the range from 1 to 5, in the range from 1 to 10, or some other range. The metric may be associated with a plurality of risk levels—for example low risk, moderate risk, and high risk.

A plurality of risk metrics may be determined by the security risk management tool 148. A single aggregate risk metric may be determined to represent the total security risk of the organization 102 across all business units and/or across all office locations. Other risk metrics may be determined by the security risk management tool 148 for each business unit and/or each office location, and the aggregate risk metric may be determined based on the subordinate risk metrics associated with individual business units and/or individual office locations. The aggregate risk metric may be calculated by averaging the subordinate risk metrics. In an embodiment, the aggregate risk metric may be calculated as a weighted average, where some of the subordinate risk metrics are weighted more heavily than others of the subordinate risk metrics, where the differential weighting is based on the perceived severity of the risks.

The risk metrics may take into account mitigations and/or countermeasures that may have been deployed by the organization 102 to reduce its susceptibility to threats to its information security. The reduction of the value of the risk metric may be determined after the correlations between manifest threat vectors and vulnerability threat vectors have been determined. Alternatively, the reduction of the value of the risk metric may happen organically by modifying an importance and/or weighting factor threat descriptor of the subject vulnerability threat vectors.

Rather than determining a risk metric that is represented abstractly as a constrained number value, for example a number in the range from 1 to 10, the security risk management tool 148 may determine a risk metric that represents a forecast financial loss to the organization 102 on an annualized basis, a quarterly basis, or some other basis. The forecast financial loss may be projected based at least in part on the correlations of manifest threat vectors with the vulnerability threat vectors and on a determination of a maximum financial loss exposure of the organization 102. In an embodiment, the forecast financial loss may further be based in part on an analysis of mitigations and/or countermeasures that have been deployed by the organization 102 to reduce its susceptibility to security threats. The compensation of forecast financial loss may be provided organically, as already suggested above, by modifying an importance and/or weighting factor threat descriptor of the vulnerability threat vectors based on the mitigations and/or countermeasures deployed. Alternatively the compensation of forecast financial loss may be provided as a separate offsetting calculation or mathematical sub-expression.

As discussed further above, the security risk management tool 148 may alternatively determine a risk metric that represents a forecast adverse impact on the organization 102 on an annualized basis, a quarterly basis, or some other basis. The adverse impact may be associated with one or more threat vectors, either manifest threat vectors and/or vulnerability threat vectors, and may relate to business disruption, direct financial loss, brand damage, and other adverse impacts. The projected adverse impact may be considered in terms of relative severity and quantifiable adverse impact, when practical.

In an embodiment, the risk metric represents a forecast financial loss relationship and/or graphical curve for the organization 102, where at least one of the independent variables of the relationship and/or curve is an investment in security measures. Alternatively, the risk metric may be based on a forecast adverse impact relationship and/or graphical curve for the organization 102, where at least one of the independent variables of the relationship and/or curve is an investment in security measures. Additional risk metrics may be determined that indicate an incremental return on investment (ROI) at different operating points of the organization 102, for example at different points on the forecast financial loss curve, based on contemplated security related actions. For example, an incremental return on investment may be determined for spending $100,000 to deploy a specific software countermeasure to estimate how much forecast financial loss is reduced. As another example, an incremental return on investment may be determined for discontinuing a countermeasure that is paid for on a periodic subscription basis, for example saving $100,000 to discontinue a specific software countermeasure to estimate how much forecast financial loss is increased. These incremental returns on investment metrics may be referred to in some contexts as sensitivities. In other embodiments, the security risk management tool 148 may calculate yet other risk metrics.

As the threat router application 114, 146 determines correlations between manifest threat vectors and vulnerability threat vectors, for example periodically and/or as new threat intelligence 116 is received, the various risk metrics may be updated by the security risk management tool 148. It is contemplated that the several risk metrics provided by the security risk management tool 148, in combination with the ongoing accumulation of threat intelligence 116 and the evaluation of this threat intelligence by the threat router application 114, 146, promote an increasingly precise and increasingly timely visualization and quantification of the security situation of the organization 102. It will be appreciated by one skilled in the art that the system 100 promotes a "virtuous circle" where increased collection of threat intelligence 116 from field threat intelligence collection team 106, from increasing numbers of organizations 102 collaboratively sharing information on security threats directed at them, and from increasing collaborative sharing of information from electronic tools such as intrusion detection systems increases both the precision and the timeliness of the determination of risk metrics by the security risk management tool 148. It will be further appreciated that the use of threat vectors comprised of threat descriptors having enumerated values as a common language for both capturing and analyzing security intelligence provides a valuable component of an infrastructure for implementing this virtuous circle. The use of the security risk management tool 148 in the context of the system 100 enables managers and executives to make good and timely decisions on the risk management of the organization 102 and to support these decisions before their superiors based on reliable, quantified information that can be readily associated to the business interests of the organization 102.

Figure 3:
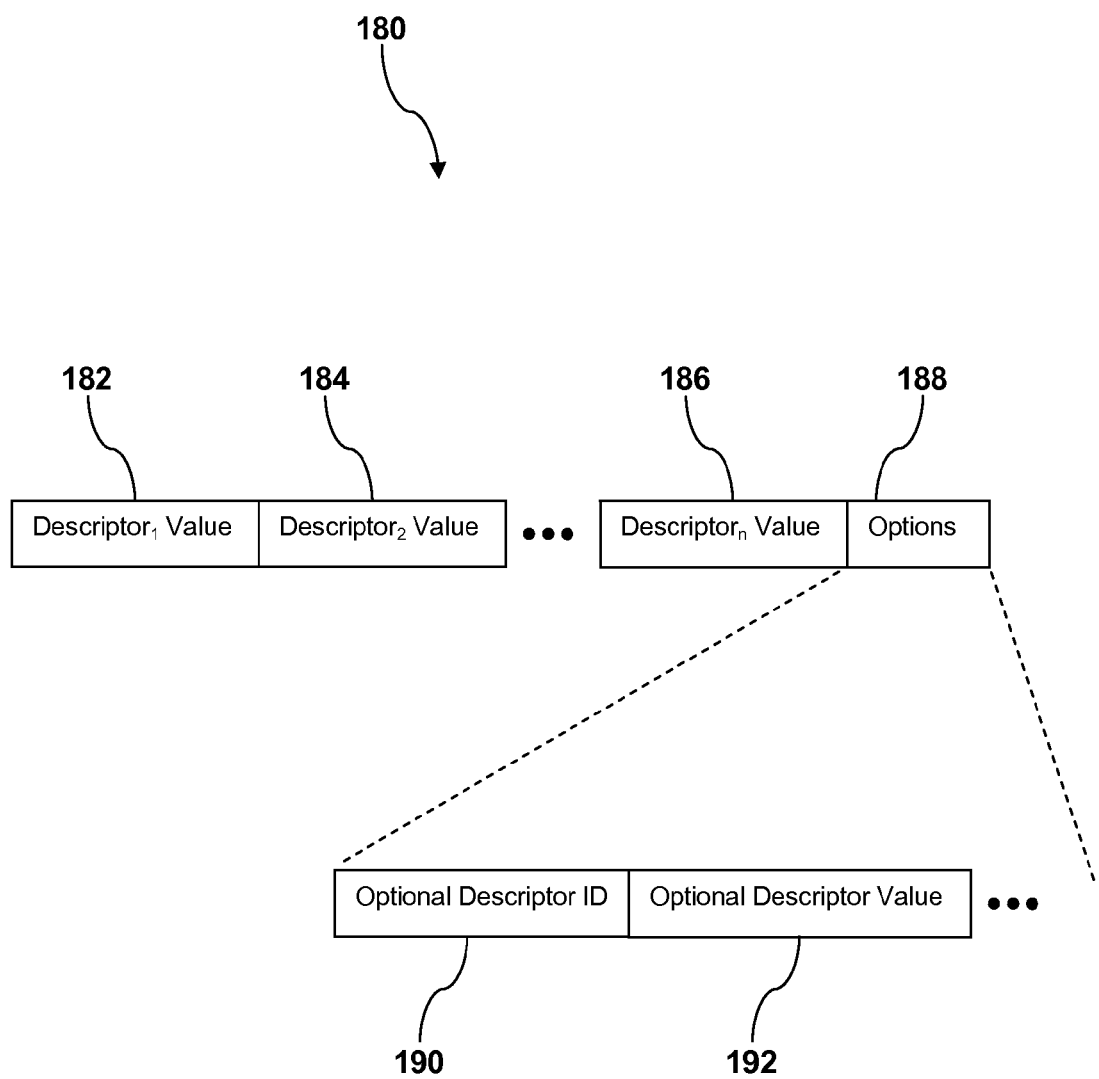
FIG. 3 is an illustration of a threat vector according to an embodiment of the disclosure.

Turning now to FIG. 3, a threat vector 180 is described. The threat vector 180 comprises a first threat descriptor 182, a second threat descriptor 184, and a third threat descriptor 186. The threat descriptors 182, 184, 186 may be referred to as mandatory threat descriptors in that, in an embodiment, every threat vector 180 comprises at least these threat descriptors. In another embodiment, the threat vector 180 may comprise a different number of mandatory threat descriptors. The threat vector 180 further comprises one or more options 188. An option may comprise an optional threat descriptor identity 190 and an optional threat descriptor 192. The employment of options allows different optional threat descriptors to be defined for a threat vector 180 as may be appropriate for the specific threat vector. For example, manifest threat vectors may have optional threat descriptors that are not associated with vulnerability threat vectors, and vulnerability threat vectors may have optional threat descriptors that are not associated with manifest threat vectors. When a correlation between threat vectors is determined, the threat router application 114, 146 may restrict correlation operations to shared threat descriptors.

Threat descriptors, whether a mandatory threat descriptor or an optional threat descriptor, are constrained to take on a predefined and enumerated list of values. The imposition of this constraint promotes the tractability of correlating manifest threat descriptors with vulnerability threat descriptors to identify manifest threat vectors of interest to the organization 102. It is contemplated that a mechanism for updating the predefined and enumerated values of threat descriptors may be provided by the first risk analysis application 112 and/or the second risk analysis application 144. As is known to one skilled in the art, the enumerated values of the threat descriptors may be conveyed as small numbers by mapping defined in software and/or in data tables. For example, a threat descriptor represented by an 8 bit byte could encode as many as 256 different enumerated values. Threat descriptors could be defined as any number of bits.

The threat vector 180 may be used to define a manifest threat vector as well as to define a vulnerability threat vector. In an embodiment, some of the threat descriptors in the manifest threat vector may be different from the threat descriptors in the vulnerability threat vector. For example, a manifest threat vector may comprise a threat report reference that identifies a location of a textual narrative related to the subject manifest threat vector, for example a universal reference locator (URL) or other reference to a report. For example, a vulnerability threat vector may comprise a threat descriptor that identifies a responsible stakeholder and/or first responder in the organization 102. For example, a vulnerability threat vector may comprise a threat descriptor that identifies an importance and/or weighting value.

It is contemplated that a wide variety of information may be captured in the threat vectors. The threat vectors may comprise a threat descriptor that provides geographical and/or location information associated with a threat, for example where a threat has been manifested or where an actor associated with a threat is located. The threat vectors may comprise a threat descriptor identifying a technology employed in perpetrating an attack. The threat vectors may comprise a threat descriptor identifying an asset that is a target of an attack. Yet other threat descriptors are contemplated by the present disclosure.

In an embodiment, a threat descriptor may identify an attack type. Values of the attack type threat descriptor may comprise adversary targeting, fraud, consumer extortion, denial of service, defacement, malware deployment, network intrusion, phishing, spam, embezzlement, and other.

In an embodiment, a threat descriptor may identify an attack tool. Values of the attack tool threat descriptor may comprise credential theft malware, denial of service malware, distributed denial of service malware, remote administration malware, exploit kit, infection management malware, mobile device malware, traffic sniffing malware, SQL injection tools, clickfraud payload, rogue antivirus, ransomware, spam malware, packer/crypter, memory scraping malware, downloader, and other tools.

In an embodiment, a threat descriptor may identify enabling infrastructures and services. Values of the enabling infrastructures and services threat descriptor may comprise adversary education, anti-virus scanning, calls service, CAPTCHA breaking, contract distributed denial of service, cryptanalysis, document counterfeiting, domain registration, hosting, infection enterprise services, malware research and development, managed malware infrastructure, money laundering, mule management, reshipping services, translation service, spam service, underground forums, virtual private network/proxy services, vulnerability and exploit research, geolocation defeat services, and others.

In an embodiment, a threat descriptor may identify actors. In an embodiment, a plurality of actor optional threat descriptors may be employed, such as an optional actor physical location threat descriptor, an optional actor marketplace role threat descriptor, an optional actor language threat descriptor, an optional actor skill threat descriptor, an optional actor motivation threat descriptor, an optional actor group threat descriptor, an optional actor programming language threat descriptor. In some cases, a threat vector may comprise multiple instances of an optional actor threat descriptor. For example, if an actor is known to use multiple languages, a threat vector identifying the actor may comprise a plurality of optional actor language threat descriptors. As another example, if an actor is known to be proficient in multiple programming languages, a threat vector identifying the actor may comprise a plurality of optional actor programming language threat descriptors. Yet other actor optional threat descriptors are contemplated by the present disclosure.

In an embodiment, a temporal threat descriptor may identify a time, a date, and/or a time date range associated with a manifest threat vector. In an embodiment, a threat descriptor may identify an asset attack target class as one of a physical asset, an enterprise network asset, a customer asset, an employee asset, a vendor asset, or another asset. It is understood that yet other threat descriptors are contemplated by and conformable with the spirit of the present disclosure. Likewise, it is understood that other threat descriptors and other threat descriptor values will be newly introduced as threats evolve and as electronic crime matures and mutates.

Figure 4:
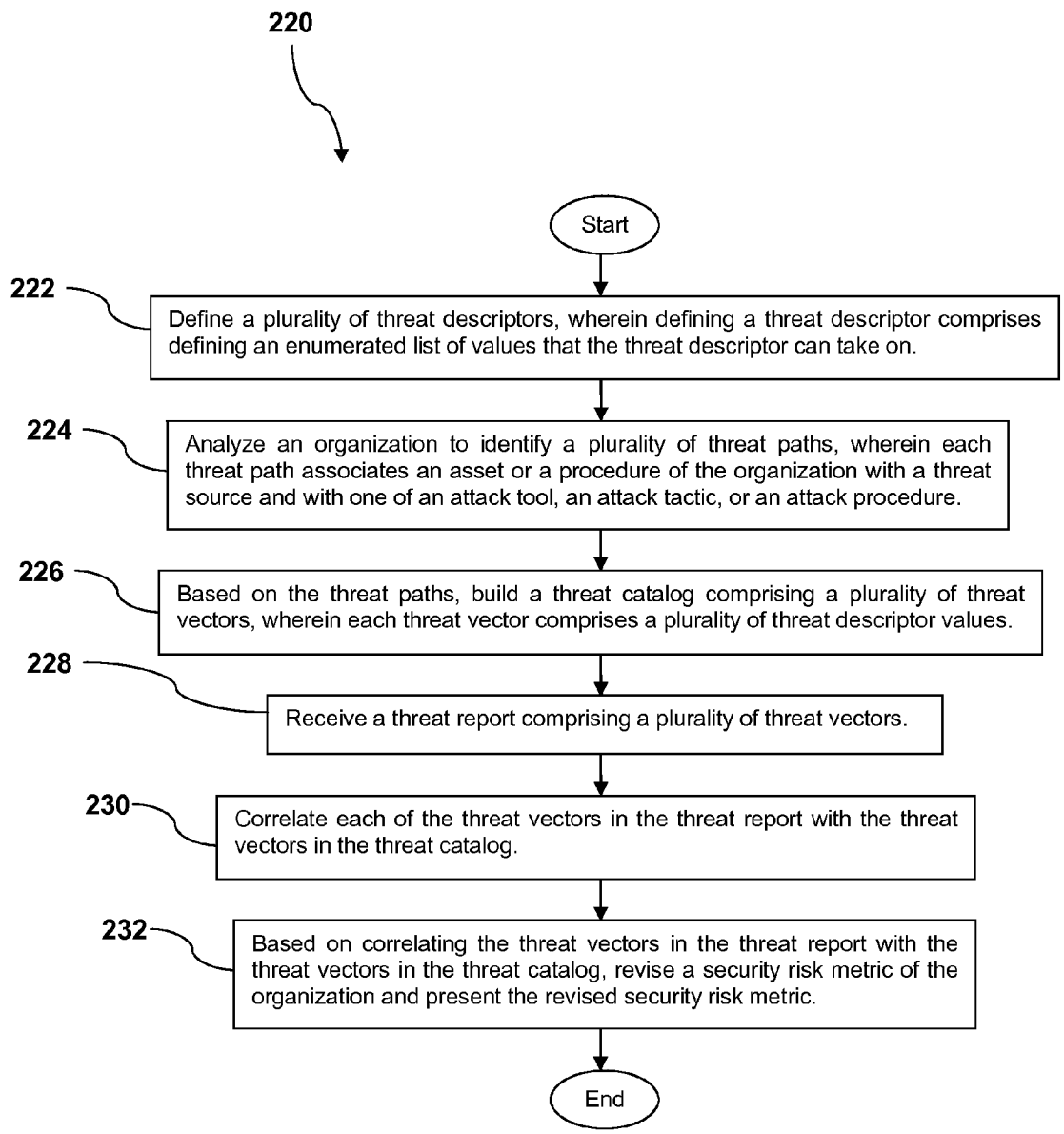
FIG. 4 is a flow chart of a method according to an embodiment of the disclosure.

Turning now to FIG. 4, a method 220 is described. At block 222, a plurality of threat descriptors are defined. Defining a threat descriptor comprises defining an enumerated list of the values that the subject threat descriptor may take on. It is understood that the number of different enumerated values defined can be expected to vary according to the specific threat descriptor. At the same time, it is contemplated that in the process of defining the enumerated values of a threat descriptor deference will be paid to constraining the number of different values to facilitate the problem of correlating manifest threat vectors with vulnerability threat vectors. Reducing the volume of threat intelligence that is called to the attention of stakeholders in the organization 102 can be served nearly as well by constraining the enumerated values to a relatively small number as by allowing the enumerated values to increase to a relatively large number, but the problem of determining correlations is made considerably more difficult when the enumerated values are too numerous. In combination with the present disclosure, one skilled in the art will readily determine a number of threat descriptor enumerated values that suitably balances the conflicting problems of throttling the volume of threat intelligence and correlating between manifest threat vectors and vulnerability threat vectors.

Defining threat descriptors may comprise associating a textual description or name of a threat descriptor value to a numeric value, for example associating "network intrusion" with the integer '5'. The association between the textual description of a threat descriptor value and the numeric value may be provided by a text file, a data table, a select list, or other representation known to those skilled in the art. From the point of view of a user or technician, the activity of defining threat descriptors may involve interacting with a user interface of the risk analysis application 112, 144, for example using a graphical user interface providing a dialog box for threat descriptor definition with fields for receiving text, and may abstract away the lower level representation of enumerated values.

It is understood that the definition of threat descriptors may be an ongoing activity. Additional enumerated values may be defined for existing threat descriptors. Additionally, new threat descriptors may be defined and enumerated values associated with those threat descriptors.

At block 224, the organization 102 is analyzed to identify a plurality of threat paths, wherein each threat path associates an asset or a procedure of the organization 102 with a threat source and with one of an attack tool, an attack tactic, or an attack procedure. At block 226, a threat catalog is built comprising a plurality of threat vectors based on the threat paths. The threat vectors in the threat catalog may be referred to as vulnerability threat vectors. The vulnerability threat vectors in the threat catalog comprise a plurality of threat descriptor values, for example a first threat descriptor having a first value, a second threat descriptor having a second value, and so forth. The vulnerability threat vectors may have an importance or weighting threat descriptor that promotes associating a perceived importance of the subject vulnerability to the organization 102.

In an embodiment, the vulnerability threat vectors to be aggregated to the threat catalog may further identify a responsible stakeholder, a first responder, and/or a team of the organization 102 who will be notified if a correlation between a manifest threat vector and the subject vulnerability threat vector is determined to exceed a threshold. For example, a vice president of sales may be notified if a vulnerability threat vector associated with client lists correlates sufficiently with a manifest threat vector. It is an observed phenomenon that electronic crime and/or cyber crime are evolving to be more targeted. To effectively combat these more precisely targeted threats, responsible stakeholders in the specific targeted business units or departments of business units may be made aware of the subject threats.

Alternatively, if the correlation of the vulnerability threat vector with a manifest threat vector is not sufficient to send notification to the vice president of sales, it may be sufficient to send to a department head or a director reporting to the vice president. The vulnerability threat vector may identify a plurality of responsible persons, possibly in a tiered order. In an embodiment, the vulnerability threat vector may identify one or more correlation thresholds corresponding to one or more responsible persons identified in the vulnerability threat vector. For example, a first correlation threshold may be associated with the vice president of sales, a second correlation threshold may be associated with the director reporting to the vice president of sales, and a third correlation threshold may be associated with the security champion reporting to the director. Alternatively the correlation thresholds may be defined in a single place for application across all the vulnerability threat vectors, for example in a data table accessible to the threat router application 114, 146. Likewise, the identification of responsible persons associated with the several correlation thresholds may be defined in a single place for application across all the vulnerability threat vectors, for example in a data table accessible to the threat router application 114, 146.

At block 228, a threat report comprising a plurality of threat vectors is received. The threat vectors in the threat report may be referred to as manifest threat vectors. Alternatively, a threat report may be received that contains a single manifest threat vector. The number of manifest threat vectors contained in a threat report may depend on whether the threat report is sent out on a periodic basis, whereupon a number of manifest threat vectors may have accumulated to be transmitted to the organization 102, or whether the threat report is sent out on the event of a new manifest threat vector being propagated to the threat intelligence 116, in which case the threat report may contain a single manifest threat vector.

At block 230, each of the threat vectors in the threat report are correlated with the threat vectors in the threat catalog 118, 152. For example, a first manifest threat vector is correlated to each vulnerability threat vector to determine a correlation of the first manifest threat vector. Next, a second manifest threat vector may be correlated to each vulnerability threat vector to determine a correlation of the second manifest threat vector. The remaining manifest threat vectors, if any, may be correlated with the vulnerability threat vectors in a similar fashion. Alternatively, when a plurality of manifest threat vectors are contained in the threat report, a different algorithm may be performed to complete the correlation operations more efficiently, for example using correlation and/or search algorithms that are known to those of skill in the art. The processing of blocks 228 and 230 may be repeated periodically, for example once per month. Alternatively, block 228 may be performed aperiodically or on an event driven basis as new threat intelligence is obtained by the field threat intelligence collection team 106 and/or as attack reports from other organizations 102 are assimilated. Alternatively, block 228 may be performed both periodically and responsive to newly arrived threat intelligence and/or attack information.

At block 232, a security risk metric of the organization 102 is revised based on the correlations between the manifest threat vectors and the vulnerability threat vectors. Additionally, the revised security risk metric may be presented, for example on the user interface 154 of one of the workstations 142. Based on the correlations, the security risk management tool 148 may update the relationship between investment in security measures and projected financial losses due to attacks. Further description of the security risk metrics that the security risk management tool 148 may determine is provided above with reference to FIG. 2.

Figure 5:
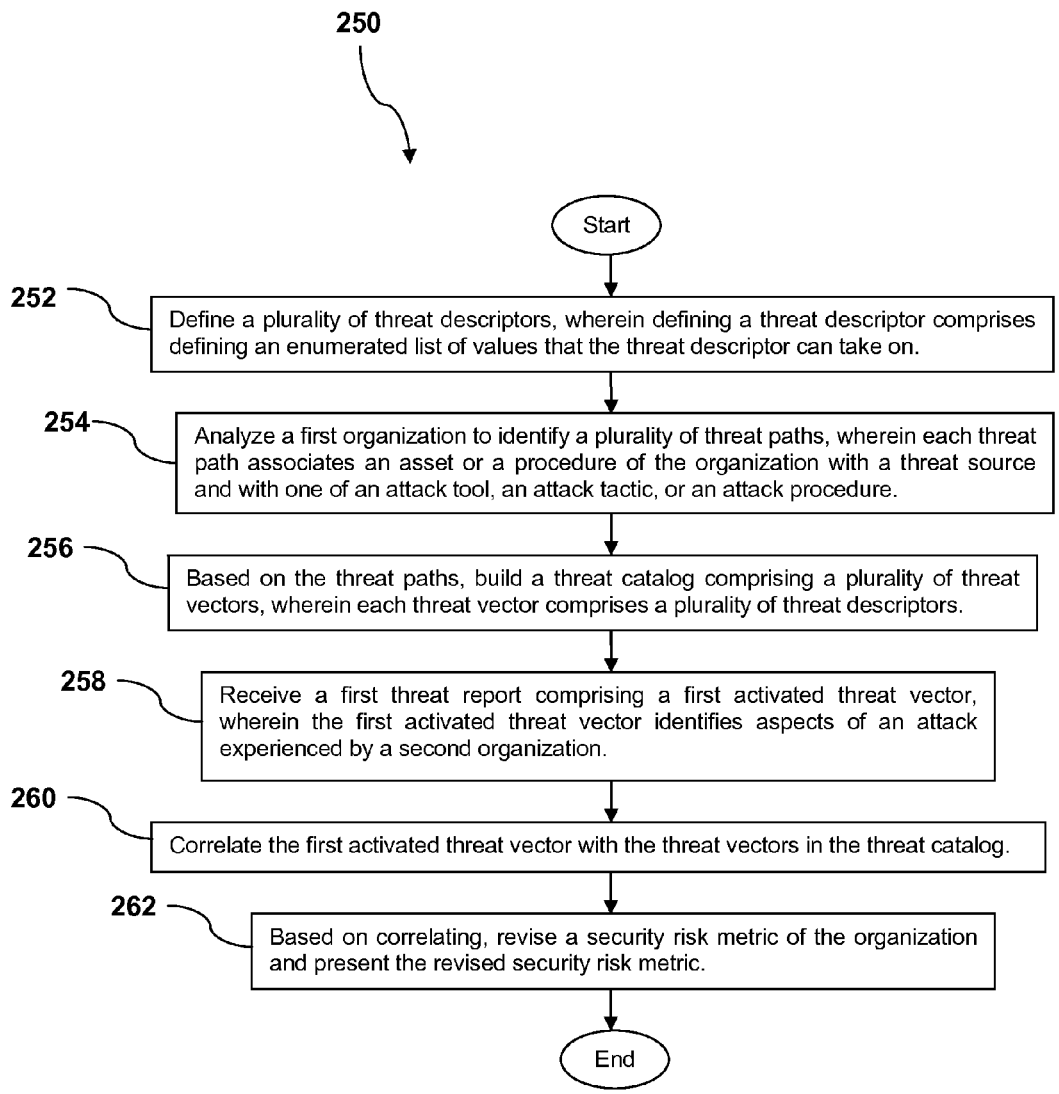
FIG. 5 is a flow chart of a method according to an embodiment of the disclosure.

Turning now to FIG. 5, a method 250 is described. The blocks of method 250 are substantially similar to the blocks of method 220, with the exception that the threat report received in block 258 relates to an attack that was unleashed on or activated on one of the organizations 102. An attack that has been unleashed or activated is an attack that has been launched and asserted against an organization 102. For example, intrusion software collecting credit card account numbers and associated security tokens for accessing these credit card accounts, such as passwords, from a computer system of a financial institution may be said to have unleashed an attack or activated an attack on that financial institution. As another example, malware that verifies the value of credit card accounts by testing electronic access and querying an amount of available credit may be said to have unleashed an attack or activated an attack on the financial institution. As yet another example, laundering software that purchases goods with stolen credit card account information and transfers the stolen value through an intermediate series of purchases and sales of goods to hide the electronic crime trail may be said to have unleashed an attack or activated an attack on the financial institution. It is understood that electronic crime may be abstracted into a lifecycle comprising a series of stages, and an attack may be unleashed and/or activated upon the organization 102 in any one of or a plurality of these stages. For example, according to one abstraction of the electronic crime lifecycle, electronic crime passes through a credentials collection phase, a monetization phase, and a laundering phase. The teachings of the present disclosure are compatible with other abstractions of the electronic crime lifecycle.

The threat report of block 258 may be said to comprise a manifest threat vector, where the manifest threat vector is understood to refer to a threat vector comprising threat descriptors articulating one of an attack that has been attempted, an attack that has been contemplated, or an attack that has been unleashed on one of the organizations 102. For example, the manifest threat vector may comprise information about a cyber attack approach that has been discussed in a clandestine cyber crime on-line discussion forum or in a computer security journal. Alternatively, the manifest threat vector may comprise information about a cyber attack which was actually attempted, detected, and repulsed by countermeasures. Alternatively, the manifest threat vector may comprise information about a cyber attack which was attempted and successfully achieved its intended purpose, for example the collection of credit card account number and associated security tokens.

Figure 6:
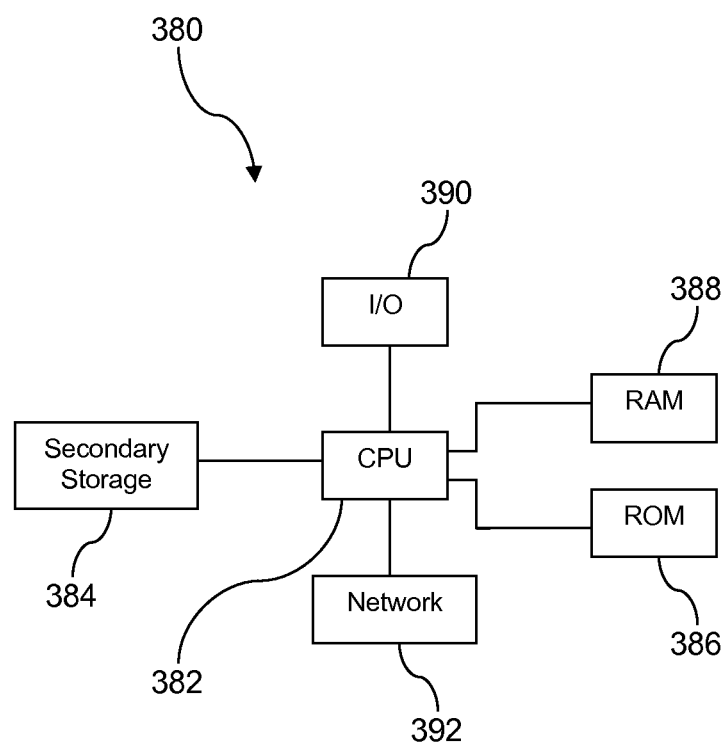
FIG. 6 illustrates an exemplary computer system suitable for implementing the several embodiments of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity devices 392 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art.

The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, a baseband signal and/or a signal embodied in a carrier wave may be referred to as a transitory signal. In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A security system, comprising:
   a computer system;
   a memory accessible to the computer system;
   a data store comprising a threat catalog, wherein the threat catalog comprises a plurality of threat vectors, wherein each threat vector of the plurality of threat vectors comprises a plurality of fields, wherein the plurality of fields comprise at least a technology field that identifies a tool employed to actuate a threat, a geography field that identifies a region where the threat was actuated, an actor field that identifies an attacker, and an attack type field that identifies a type of security attack, and wherein each field of the plurality of fields is constrained to carry a value selected from a predefined list of enumerated values; and an application stored in the memory that, when executed by the computer system, receives a threat report, wherein the threat report comprises an identification of at least one threat vector, wherein the at least one threat vector comprises at least the technology field, the geography field, the actor field, and the attack type field, and wherein each of the technology field, the geography field, the actor field, and the attack type field is constrained to carry a value selected from the defined list of enumerated values, determines a correlation between the at least one threat vector received in the threat report with the plurality of threat vectors comprising the threat catalog by comparing the values of the technology field, the geography field, the actor field, and the attack type field for the at least one threat vector received in the threat report to the corresponding values of the technology field, the geography field, the actor field, and the attack type field for the plurality of threat vectors comprising the threat catalog, when the correlation exceeds a predefined threshold, sends a notification to a stakeholder in an organization under the protection of the security system.

2. The system of claim 1, wherein the plurality of fields further comprises an asset field, wherein the asset field identifies a type of asset attacked by the threat.

3. The system of claim 1, wherein the actor field comprises a plurality of profile fields, wherein the profile fields define characteristics of the actor and wherein the profile fields comprise at least one of a physical location of the actor, a language capability of the actor, a skill of the actor, an activity of the actor, an identity of an associate of the actor, a motivation of the actor, a phone number of the actor, an email address of the actor, a postal address of the actor, a residence address of the actor, and a programming language capability of the actor.

4. The system of claim 1, wherein the values of type of security attack comprise adversary targeting, adversary espionage, fraud, consumer extortion, denial of service, malware deployment, phishing, network intrusion, spam, and embezzlement.

5. The system of claim 1, wherein the application further modifies a security risk metric based on the correlation and displays the modified security risk metric.

6. A method of managing security risks, comprising:

defining a plurality of threat descriptors, wherein the plurality of threat descriptors comprises at least a technology threat descriptor that identifies a tool employed to actuate a threat, a geography threat descriptor that identifies a region where the threat was actuated, an actor threat descriptor that identifies an attacker, and an attack type threat descriptor that identifies a type of security attack, and wherein defining a plurality of threat descriptors comprises defining an enumerated list of values that each threat descriptor of the plurality of threat descriptors can take on;

analyzing an organization to identify a plurality of threat paths, wherein each threat path associates an asset or a procedure of the organization with a threat source and with one of an attack tool, an attack tactic, or an attack procedure;

based on the threat paths, building a threat catalog comprising a plurality of threat vectors, wherein each threat vector of the plurality of threat vectors in the threat catalog comprises a threat descriptor value from the enumerated list of values for each of the technology threat descriptor, the geography threat descriptor, the actor threat descriptor, and the attack type threat descriptor;

receiving, by a computer system, a threat report comprising a plurality of threat vectors, wherein each threat vector of the plurality of threat vectors in the threat report comprises a threat descriptor value from the enumerated list of values for each of the technology threat descriptor, the geography threat descriptor, the actor threat descriptor, and the attack type threat descriptor;

correlating, by the computer system, each of the plurality of threat vectors in the threat report with the plurality of threat vectors in the threat catalog by comparing the threat descriptor value for each of the technology threat descriptor, the geography threat descriptor, the actor threat descriptor, and the attack type threat descriptor for each of the plurality of threat vectors in the threat report to the corresponding threat descriptor value for each of the technology threat descriptor, the geography threat descriptor, the actor threat descriptor, and the attack type threat descriptor for the plurality of threat vectors in the threat catalog;

based on correlating the threat vectors in the threat report with the threat vectors in the threat catalog, revising, by the computer system, a security risk metric of the organization; and presenting, by the computer system, the revised security risk metric.

7. The method of claim 6, wherein the security risk metric identifies a current operating point of the organization according to a relationship between projected loss and investment in security.

8. The method of claim 7, further comprising based on correlating the threat vectors in the threat report with the threat vectors in the threat catalog, revising the relationship between projected loss and investment in security.

9. The method of claim 6, further comprising sending, by the computer system, a notification to a stakeholder of the organization when the correlating exceeds a predetermined threshold, wherein the stakeholder is responsible for an asset identified by a threat descriptor in a threat vector in the threat report.

10. The method of claim 6, further comprising
analyzing a security attack to identify a plurality of threat descriptors that are associated with the security attack; and
based on analyzing the security attack, defining a threat vector comprised of a plurality of threat descriptor values, wherein the threat vector is one of the threat vectors comprising the threat report.

11. The method of claim 10, wherein defining the threat vector comprises coercing the results of analyzing the security attack into the predefined enumerated list of values associated with the threat descriptors.

12. The method of claim 6, wherein correlating each of the threat vectors in the threat report with the threat vectors in the threat catalog is based on weighting a correlation of a threat descriptor in a threat vector in the threat catalog with a corresponding threat descriptor in a threat vector in the threat report.

13. The method of claim 12, wherein the weighting is based at least in part on a countermeasure deployed by the organization, wherein the countermeasure is associated with the threat descriptor.

14. The method of claim 12, wherein the weighting is based at least in part on a projected impact on the organization of an attack associated with the threat vector in the threat catalog.

15. The method of claim 6, wherein the plurality of threat vectors in the threat catalog comprise standard threat descriptors and optional threat descriptors.

16. The method of claim 15, wherein a threat vector of the threat catalog comprises an identification of an optional threat descriptor and a value of the optional threat descriptor.

17. A method of managing security risks, comprising:
defining a plurality of threat descriptors, wherein the plurality of threat descriptors comprises at least a technology threat descriptor that identifies a tool employed to actuate a threat, a geography threat descriptor that identifies a region where the threat was actuated, an actor threat descriptor that identifies an attacker, and an attack type threat descriptor that identifies a type of security attack, and wherein defining a plurality of threat descriptors comprises defining an enumerated list of values that each threat descriptor of the plurality of threat descriptors can take on;
analyzing a first organization to identify a plurality of threat paths, wherein each threat path associates an asset or a procedure of the organization with a threat source and with one of an attack tool, an attack tactic, or an attack procedure;
based on the threat paths, building a threat catalog comprising a plurality of threat vectors, wherein each threat vector of the plurality of threat vectors in the threat catalog comprises a threat descriptor value from the enumerated list of values for each of the technology threat descriptor, the geography threat descriptor, the actor threat descriptor, and the attack type threat descriptor;
receiving, by a computer system, a first threat report comprising a first manifest threat vector, wherein the first manifest threat vector identifies aspects of an attack experienced by a second organization, and wherein the first manifest threat vector comprises a threat descriptor value from the enumerated list of values for each of the technology threat descriptor, the geography threat descriptor, the actor threat descriptor, and the attack type threat descriptor;
correlating, by the computer system, the first manifest threat vector with the plurality of threat vectors in the threat catalog by comparing the threat descriptor value for each of the technology threat descriptor, the geography threat descriptor, the actor threat descriptor, and the attack type threat descriptor for the first manifest threat vector to the corresponding threat descriptor value for each of the technology threat descriptor, the geography threat descriptor, the actor threat descriptor, and the attack type threat descriptor for the plurality of threat vectors in the threat catalog;
based on correlating, revising, by the computer system, a security risk metric of the organization; and
presenting, by the computer system, the revised security risk metric.

18. The method of claim 17, wherein the first threat report is generated by an intrusion detection system and wherein the first manifest threat vector identifies an attempt to subvert a firewall of the second organization.

19. The method of claim 17, further comprising :
receiving a second threat report comprising a second manifest threat vector, wherein the second manifest threat vector identifies aspects of an attack experienced by a third organization;
correlating the second manifest threat vector with the threat vectors in the threat catalog and with the first manifest threat vector;
based on correlating the second manifest threat vector with the threat vectors in the threat catalog and with the first manifest threat vector, identifying a threat target shifting;
based on identifying the threat target shifting, revising the security risk metric of the organization; and
after identifying the threat target shifting, presenting the revised security risk metric.

* * * * *